(12) United States Patent
Scoley et al.

(10) Patent No.: US 10,717,532 B2
(45) Date of Patent: Jul. 21, 2020

(54) DUAL URINAL LAVATORY MONUMENT

(71) Applicant: C&D Zodiac, Inc., Huntington Beach, CA (US)

(72) Inventors: Ian Geoffrey Scoley, Huntington Beach, CA (US); Scott Savian, Huntington Beach, CA (US)

(73) Assignee: C&D ZODIAC, INC., Huntington Beach, CA (US)

( * ) Notice: Subject to any disclaimer, the term of this patent is extended or adjusted under 35 U.S.C. 154(b) by 0 days.

(21) Appl. No.: 16/160,802

(22) Filed: Oct. 15, 2018

(65) Prior Publication Data

US 2019/0127068 A1 May 2, 2019

Related U.S. Application Data

(60) Provisional application No. 62/578,896, filed on Oct. 30, 2017.

(51) Int. Cl.
*B64D 11/02* (2006.01)

(52) U.S. Cl.
CPC ................... *B64D 11/02* (2013.01)

(58) Field of Classification Search
CPC ....... B64D 11/02; E03D 1/003; E04H 1/1216; B60R 15/00; B61D 35/005
See application file for complete search history.

(56) References Cited

U.S. PATENT DOCUMENTS

| | | | |
|---|---|---|---|
| 7,222,820 B2 | 5/2007 | Wentland | |
| 7,284,287 B2 | 10/2007 | Cooper | |
| 7,299,511 B2 * | 11/2007 | Quan | B64D 11/02 4/664 |
| 7,364,119 B2 | 4/2008 | Sprenger | |
| 9,056,682 B2 * | 6/2015 | Ehlers | B64D 11/02 |
| 9,260,850 B2 * | 2/2016 | Seibt | B64D 11/02 |
| 9,340,289 B2 * | 5/2016 | Minegishi | B64D 11/02 |
| 9,452,837 B2 * | 9/2016 | Koyama | B64D 11/02 |
| 9,457,903 B2 * | 10/2016 | Moje | B64D 11/00 |
| 9,527,591 B2 * | 12/2016 | Savian | B64D 11/02 |

(Continued)

FOREIGN PATENT DOCUMENTS

JP 06040399 * 2/1994 ............ B64D 11/02

OTHER PUBLICATIONS

International Search Report and Written Opinion issued in PCT/US 18/55934.

*Primary Examiner* — David P Angwin
*Assistant Examiner* — Nicholas A Ros
(74) *Attorney, Agent, or Firm* — Jeffer Mangels Butler & Mitchell LLP; Brennan C. Swain, Esq.

(57) ABSTRACT

A lavatory monument configured to be positioned in an aircraft interior that includes an enclosure that includes first, second, third and fourth walls, and defines a lavatory interior, a first lavatory compartment that includes a first urinal unit positioned therein, and a second lavatory compartment that includes a second urinal unit positioned therein. The first lavatory compartment includes a first door and the second lavatory compartment includes a second door. A divider wall separates at least a portion of the first lavatory compartment from at least a portion of the second lavatory compartment. The first door is positioned on one of the first or second walls and the second door is positioned on one of the first or third walls.

18 Claims, 9 Drawing Sheets

(56) References Cited

U.S. PATENT DOCUMENTS

| | | |
|---|---|---|
| 9,688,407 B2 | 6/2017 | McIntosh |
| 9,963,233 B2 * | 5/2018 | Detjen .................. B64D 11/02 |
| 2005/0241062 A1 | 11/2005 | Quan |
| 2014/0339360 A1 | 11/2014 | Moje |
| 2015/0298809 A1 | 10/2015 | Minegishi |
| 2016/0236785 A1 * | 8/2016 | McIntosh ............... B64D 11/00 |
| 2017/0101184 A1 | 4/2017 | Scoley |

* cited by examiner

DUAL URINAL LAVATORY MONUMENT

CROSS REFERENCE TO RELATED APPLICATIONS

This application claims the benefit of U.S. Provisional Application No. 62/578,896, filed Oct. 30, 2017, the entirety of which is incorporated herein by reference.

FIELD OF THE INVENTION

The present invention relates generally to a lavatory monument, and more particularly to a lavatory monument that includes two urinal compartments therein.

BACKGROUND OF THE INVENTION

Normal aircraft lavatories in wide body, twin aisle aircraft are unisex and include a conventional toilet, wash basin with plumbed water supply and supporting amenities (towels, tissues, seat covers, etc.). These lavatories are often positioned along the centerline of the aircraft and are positioned near the door three zone in the heart of a high density economy class cabin. Long wait times can be bothersome for those in line and those seated near the lavatory.

SUMMARY OF THE INVENTION

In accordance with a first aspect of the present invention there is provided a lavatory monument configured to be positioned in an aircraft interior that includes an enclosure that includes first, second, third and fourth walls, and defines a lavatory interior, a first lavatory compartment that includes a first urinal unit positioned therein, and a second lavatory compartment that includes a second urinal unit positioned therein. The first lavatory compartment includes a first door and the second lavatory compartment includes a second door. A divider wall separates at least a portion of the first lavatory compartment from at least a portion of the second lavatory compartment. The first door is positioned on one of the first or second walls and the second door is positioned on one of the first or third walls. In a preferred embodiment, the first and second urinal units include shared plumbing. Preferably, the lavatory monument includes a plumbing enclosure and the shared plumbing is housed within the plumbing enclosure. Preferably, the plumbing enclosure is positioned between the first and second urinal units.

In a preferred embodiment, the lavatory monument includes a trash enclosure that defines a trash interior. The trash enclosure includes a first trash opening within the first lavatory compartment that opens to an interior of the trash enclosure and a second trash opening within the second lavatory compartment that opens to the interior of the trash enclosure. Preferably, the trash enclosure includes a trash access door that communicates the trash interior with an exterior of the enclosure. In a preferred embodiment, the trash interior includes a trash receptacle positioned therein.

In a preferred embodiment, the first urinal unit is positioned at a non-right angle to the divider wall, and the second urinal unit is positioned at a non-right angle to the divider wall. Preferably, the first urinal unit is positioned at an approximately 45° angle to the divider wall and the second urinal unit is positioned at an approximately 45° angle to the divider wall. In a preferred embodiment, the lavatory monument includes a third lavatory compartment that includes a conventional toilet therein. Preferably, the third lavatory compartment has approximately the same footprint as the first and second lavatory compartments combined.

In accordance with another aspect of the present invention there is provided a lavatory monument configured to be positioned in an aircraft interior that includes an enclosure that includes first, second, third, fourth and fifth walls and defines a lavatory interior. The lavatory monument includes a first lavatory compartment that includes a first urinal unit positioned therein and a second lavatory compartment that includes a second urinal unit positioned therein. The first lavatory compartment includes a first door, the second lavatory compartment includes a second door and a divider wall separates at least a portion of the first lavatory compartment from at least a portion of the second lavatory compartment. The lavatory monument also includes a third lavatory compartment that includes a toilet positioned therein. The third lavatory compartment includes a third door. The fourth wall separates the third lavatory compartment from the first and second lavatory compartments. The first door is positioned on one of the first or second walls, the second door is positioned on one of the first or third walls, and the third door is positioned on the fifth wall.

The present invention can increase lavatory capacity (two for one) and through-put (two for one plus single functionality) within a high density cabin, while reducing cost, weight and maintenance effort (significantly simpler product with shared systems and facilities). In addition, perceived hygiene can be improved by limiting male abuse of conventional lavatories (splash zone and wet floors), thus improving the situation for female users. In a preferred embodiment, the system can also use significantly less water than a conventional toilet & wash basin.

It will be appreciated that the double urinal (male specific) can replace a single 60"×30" conventional lavatory (toilet & wash-basin). Since the resulting configuration is male specific and purely for liquid relief, cost weight and complexity can be reduced by replacing conventional plumbed wash-basins with disposable sanitary wipes. Likewise, the urinals can share a common water/waste system and the two compartments can share a common trash compartment for convenient disposal of sanitizer wipes and other trash.

The present invention can also increase revenue for airlines. The two urinals can replace one conventional toilet, giving the opportunity to remove another conventional lavatory and add seats. The present invention can also improve the user experience by separating the male toilet and providing specific, high volume usage. Additionally, it is anticipated to reduce toilet queue time through reduced dwell times and increase lavatory count within a high-density cabin. For cabin crew, on-board flight maintenance is simpler with minimal use of disposable paper products, wet areas and aisle access to a single shared trash compartment.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
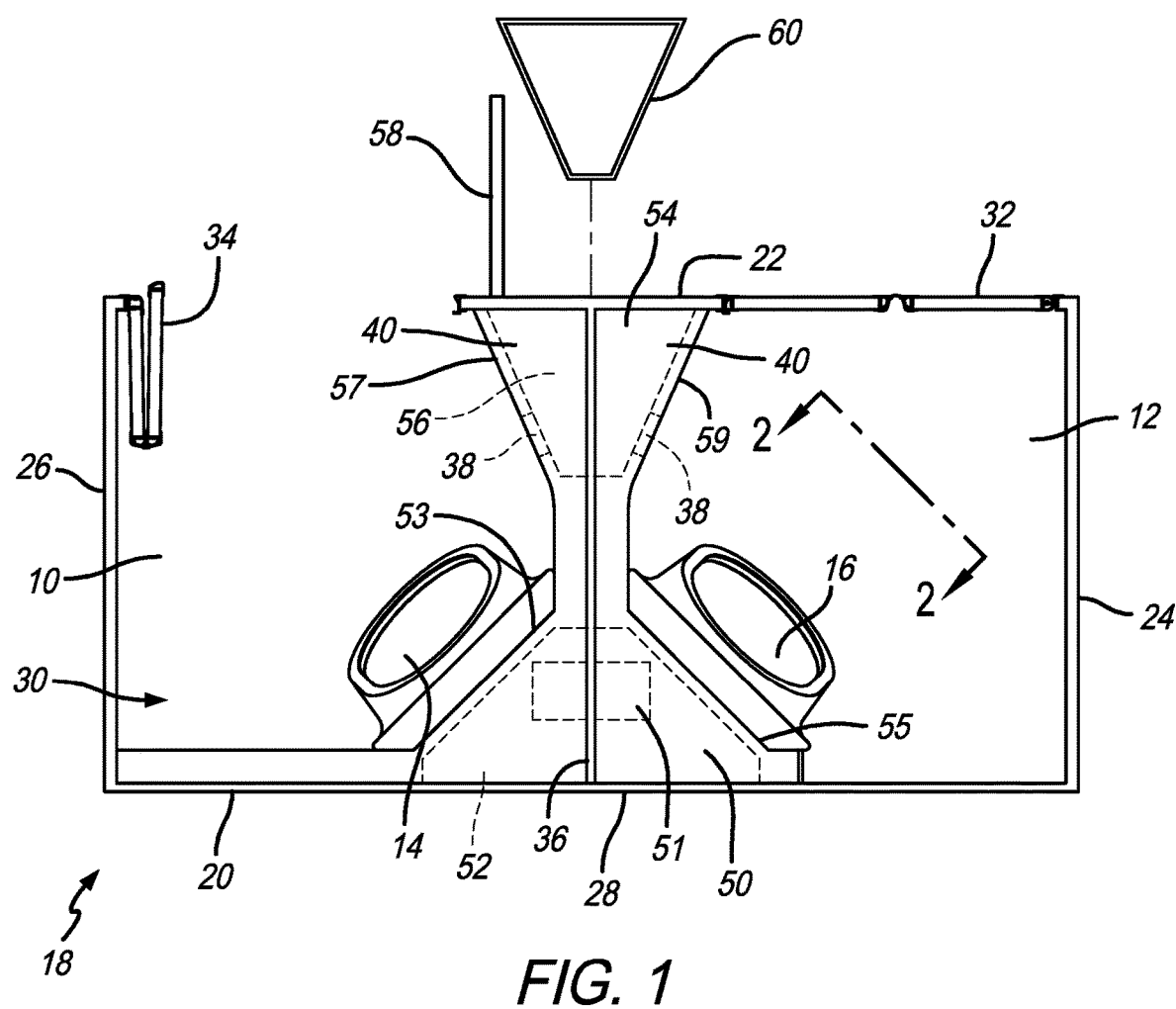
FIG. 1 is a plan view of a lavatory monument in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "upper," "lower," "side," "short," "long," "up," "down," and "below" used herein are merely for ease of description and refer to the orientation of the components as shown in the figures. It should be understood that any orientation of the components described herein is within the scope of the present invention.

Referring now to the drawings, which are for purposes of illustrating the present invention and not for purposes of limiting the same, FIGS. 1-8 show embodiments of lavatory monuments that include two, dual or first and second lavatory compartments 10 and 12 with first and second urinal units or urinals 14 and 16 therein.

As shown in FIG. 1, lavatory monument 18 includes an enclosure 20 with first 22, second 24, third 26 and fourth 28 walls that cooperate to define a lavatory interior 30. The first lavatory compartment 10 includes the first urinal unit 14 positioned therein, and includes a first door 32 positioned on one of the first 22 or second 24 walls. The first door 32 is movable between an open and a closed position and allows access from the exterior of the monument to the interior of the first lavatory compartment 10. The second lavatory compartment 12 includes the second urinal unit 16 positioned therein, and includes a second door 34 positioned on one of the first 22 or third 26 walls. The second door 34 is movable between an open and a closed position and allows access from the exterior of the monument to the interior of the second lavatory compartment 12. FIG. 1 shows the first and second doors 32 and 34 on the first wall 22. A divider wall 36 separates at least a portion of the first lavatory compartment 10 from at least a portion of the second lavatory compartment 12. In a preferred embodiment, the divider wall 36 does not extend the entire way from the floor to the ceiling in order to allow the shared trash interior and shared plumbing interior, as discussed herein.

Figure 2:
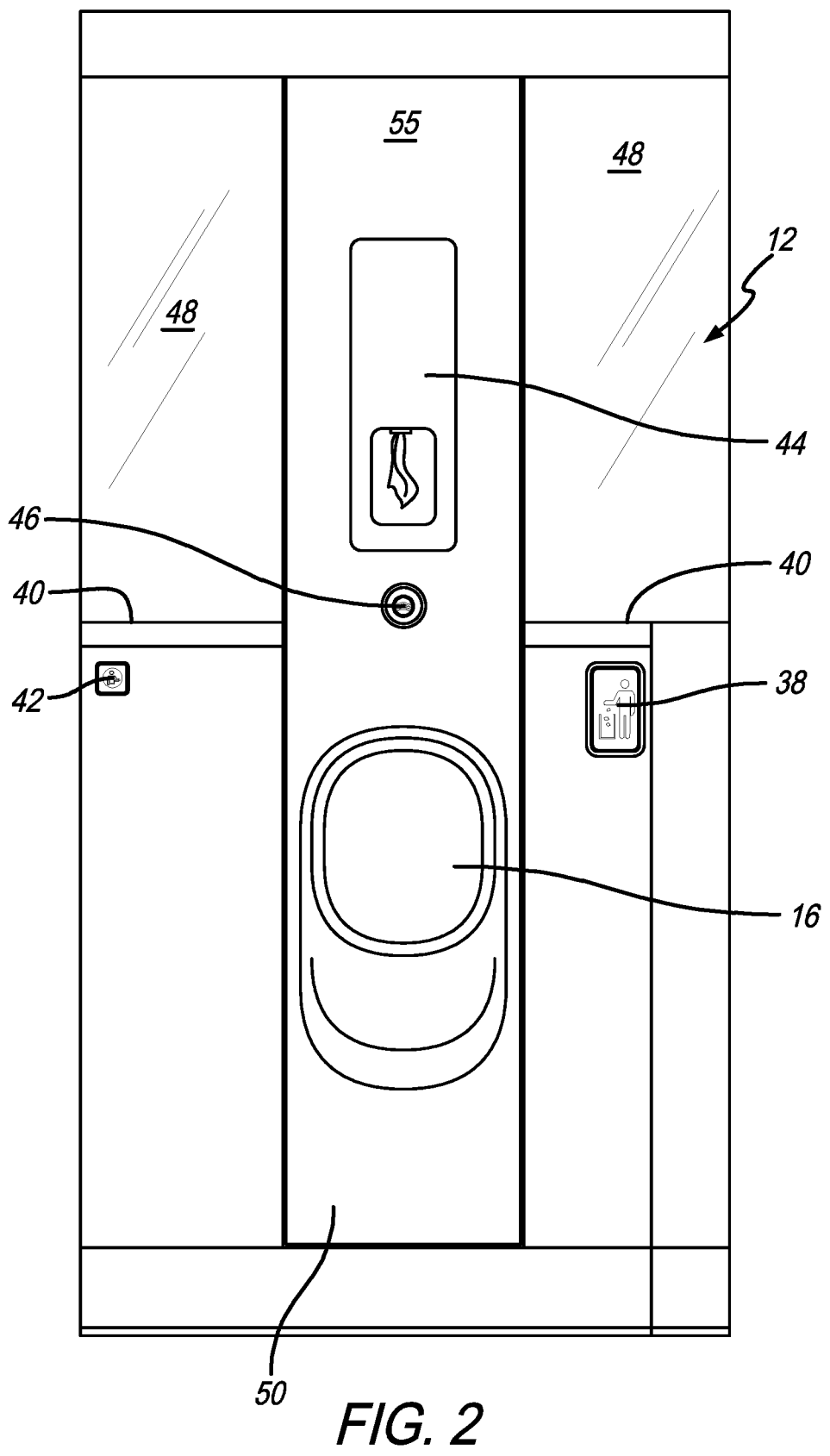
FIG. 2 is an elevational view of a portion of the interior of the lavatory monument of FIG. 1.

As shown in FIG. 2, in a preferred embodiment, each urinal compartment includes one of more of the urinal unit 14 or 16, a trash opening 38 that includes a flap/door, a countertop 40 for personal items (e.g. cell phones, keys, etc.), an emergency assist call button 42, a dry hand sanitizer towel dispenser 44 (a sink can also be included), flush button 46 (automatic flush can also be used) and wall mirrors 48. Each compartment can include other amenities, such as a "return to seat" to seat sign, sink, lights, tissue dispenser, etc. The positioning of the towel dispenser 44 above the urinal makes use of the small compartment easier and prevents the occupant from having to turn.

Figure 9:
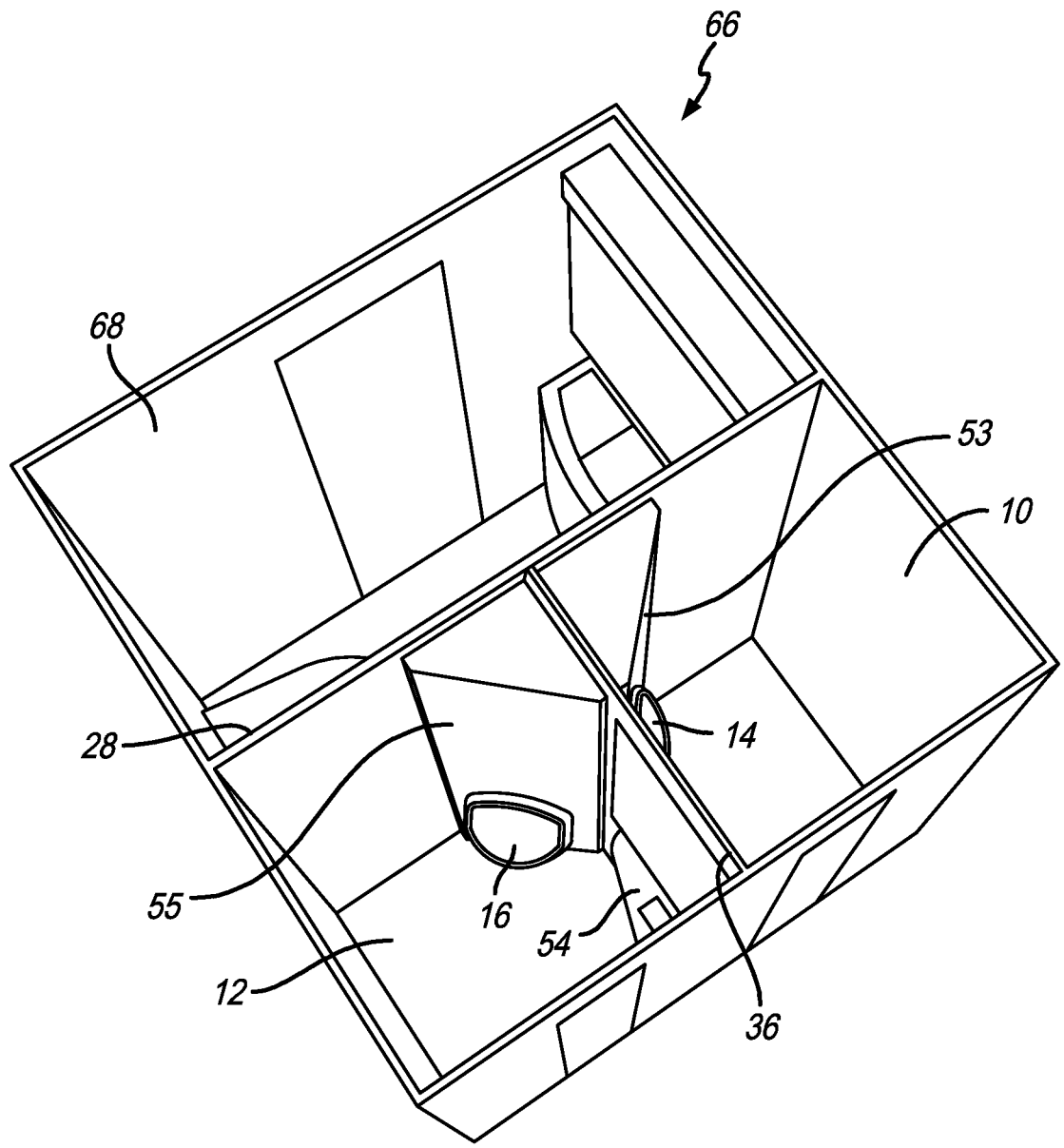
FIG. 9 is a perspective view of a lavatory monument in accordance with a preferred embodiment of the present invention.

As shown in FIG. 1, in a preferred embodiment, the first and second urinal units 14 and 16 include shared water and waste (e.g., plumbing) systems. Preferably, the lavatory monument 18 includes a plumbing enclosure 50 that defines a plumbing interior 52. The shared plumbing 51 is housed within the plumbing enclosure 50 and at least a portion of the plumbing enclosure 50 is positioned between the first and second urinals 14 and 16. However, in another embodiment each urinal unit can include separate water and waste systems. As shown in FIG. 9, in a preferred embodiment, the plumbing enclosure 50 includes a first plumbing enclosure wall 53 positioned in the first lavatory compartment 10 and a second plumbing enclosure wall 55 positioned in the second lavatory compartment 12. The first plumbing enclosure wall 53 extends between the divider wall 36 and the fourth wall 28 and the second plumbing enclosure wall 55 extends between the divider wall 36 and the fourth wall 28.

Figure 3:
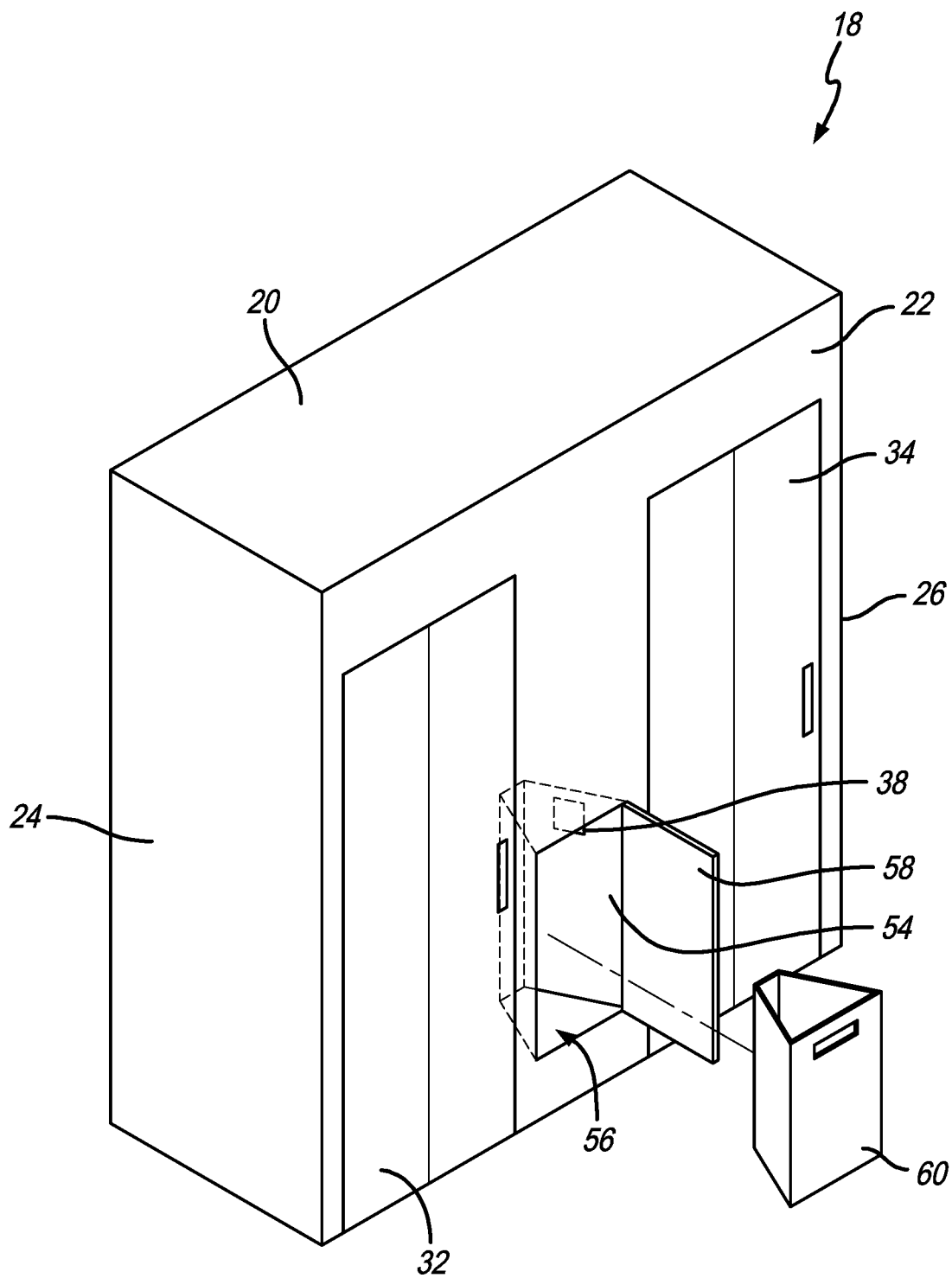
FIG. 3 is a perspective view of the lavatory monument of FIG. 1 with the trash access door in the open position.

As shown in FIGS. 1 and 3, in a preferred embodiment, the lavatory monument 18 includes a trash enclosure 54 that defines a trash interior 56. In a preferred embodiment, the trash enclosure 54 includes first trash opening 38 within the first lavatory compartment 10 that opens to the trash interior 56 and a second trash opening 38 within the second lavatory compartment 12 that opens to the trash interior 56. Each trash opening 38 can include a door, flap or the like to open and close the opening and to insert trash into the trash interior 56 and any receptacle(s) therein. In a preferred embodiment, the trash enclosure 54 includes a first trash enclosure wall 57 positioned in the first lavatory compartment 10 and a second trash enclosure wall 59 positioned in the second lavatory compartment 12. The first trash enclosure wall 57 extends between the divider wall 36 and the first wall 22 at a non-right angle to the divider wall 36 and the second trash enclosure wall 59 extends between the divider wall 36 and the first wall 22 at a non-right angle to the divider wall 36. Preferably, the trash enclosure 54 includes a trash access door 58 that communicates the trash interior 56 with an exterior of the monument 18. In use, the trash interior 56 includes a single, common trash receptacle 60 positioned therein for convenient waste removal. In another embodiment, the trash interior 56 can include a separate trash container and/or a separate access door for removal and emptying of the receptacle 60. In a preferred embodiment, the trash enclosure 54 and plumbing enclosure 50 are unitary and part of the same structure. As a result, the trash interior 56 and plumbing interior 52 are in communication with one another.

Figure 4:
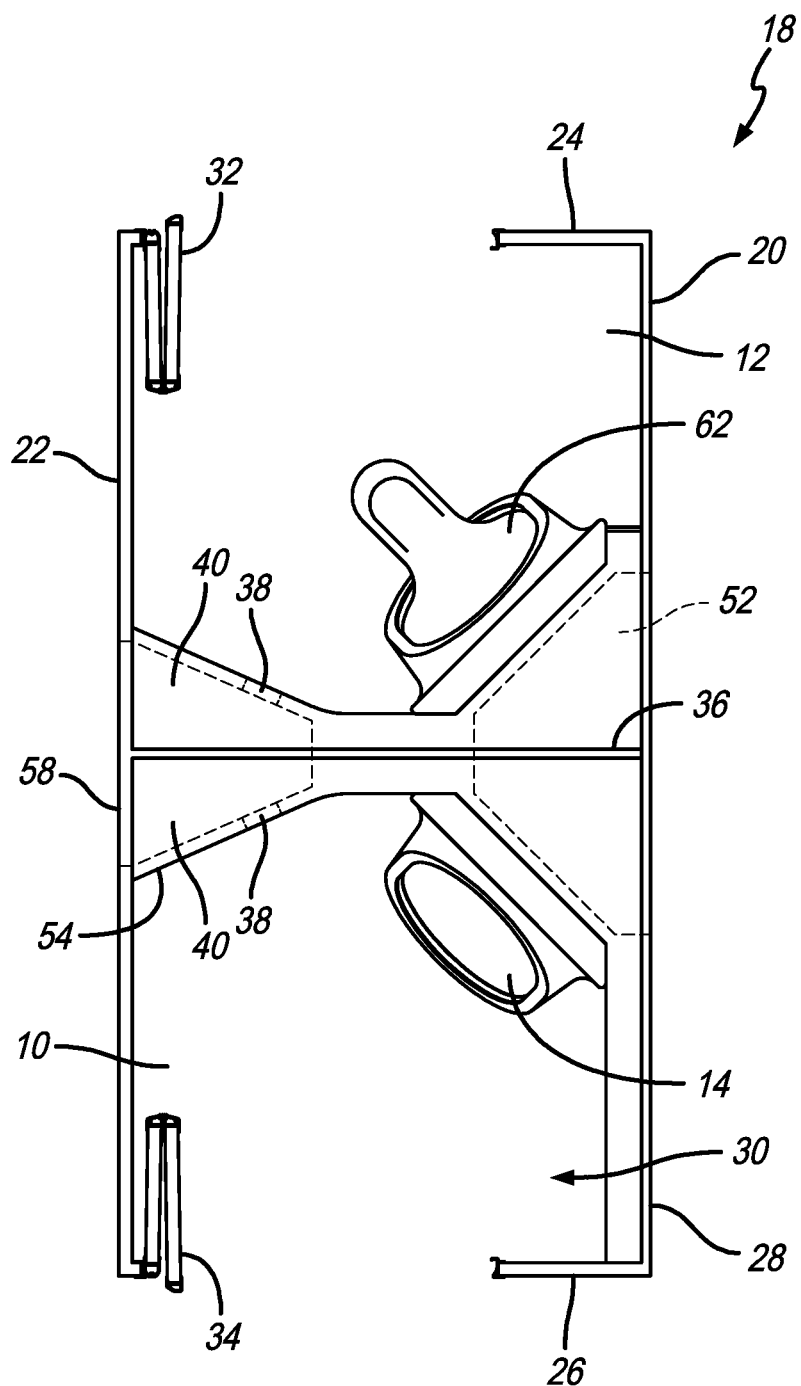
FIG. 4 is a plan view of a lavatory monument in accordance with a preferred embodiment of the present invention.

FIG. 4 shows the first and second doors 32 and 34 on the second and third walls 24 and 26. FIG. 4 also shows a unisex urinal unit 62 that can be used in place of the standard male only urinals in any of the lavatories.

As shown in FIGS. 1 and 4, in a preferred embodiment, the first and second urinal units 14 and 16 are positioned at a non-right angle to the divider wall 36. Preferably, as shown in the figures, the first and second urinal units 12 and 14 are positioned or mounted in a corner, on a wall or on the plumbing enclosure 50 at an approximately 45° angle (see θ in FIG. 1) to the divider wall. This provides ambidextrous access and is beneficial for those who use their right hand to use the urinal and for those who use their left hand to use the urinal. However, other angles are within the scope of the invention. Angles between 0° and 45° are advantageous for the shared plumbing between the compartments. However, any angle is within the scope of the present invention. In another embodiment, the urinals can be positioned at a right angle with respect to the divider wall, thereby allowing someone to walk in through a door on the first wall 22 and directly to the urinal.

Figure 5:
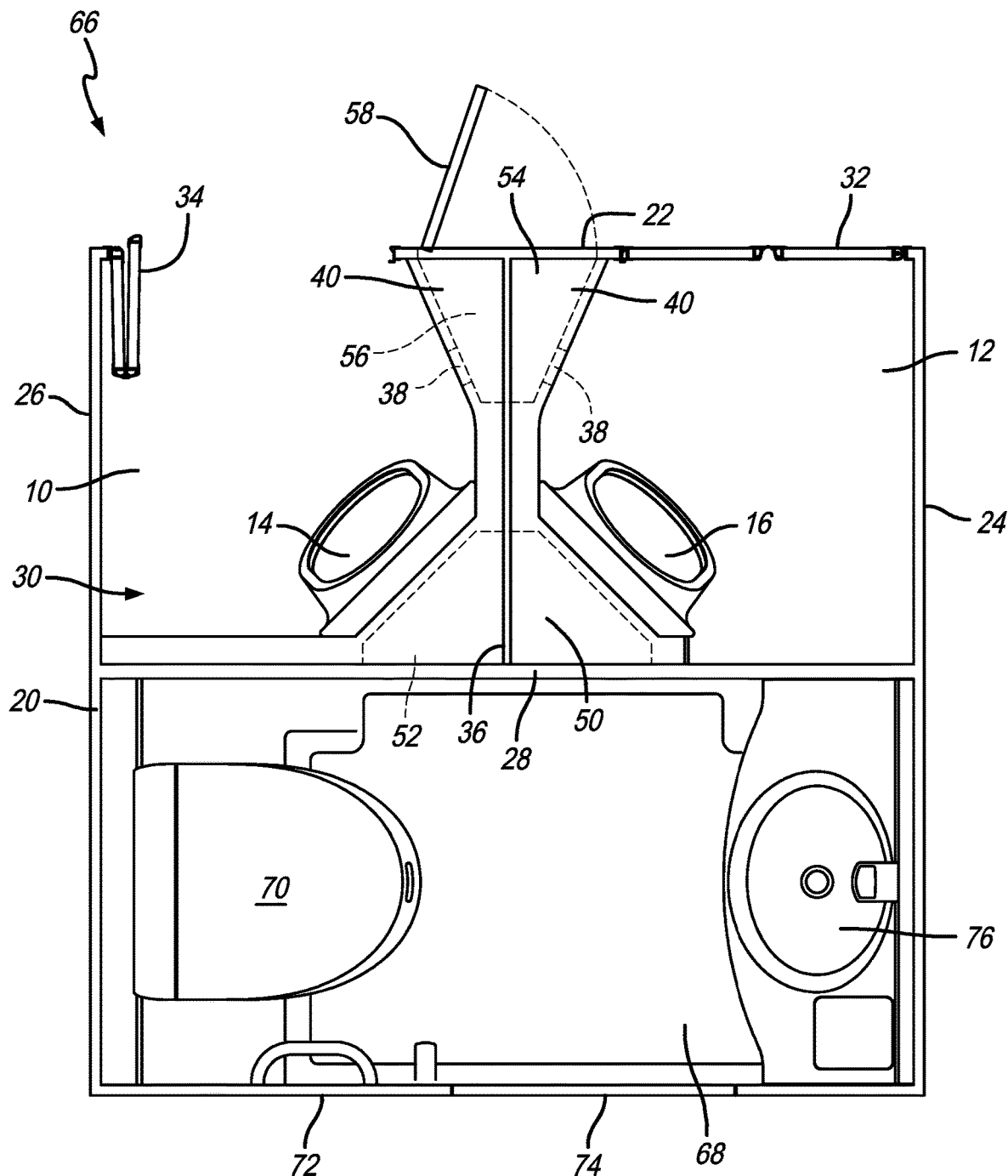
FIG. 5 is a plan view of a lavatory monument in accordance with a preferred embodiment of the present invention.

As shown in FIG. 5, lavatory monument 66 includes a third lavatory compartment 68 with a conventional toilet 70. In this embodiment, the fourth wall 28 is an interior wall that separates the first and second lavatory compartments 10 and 12 from the third lavatory compartment 68. The second and third walls 24 and 26 are extended and connected by a fifth wall 72. A third door 74 is positioned on the fifth wall 72. Preferably, the third lavatory compartment 68 includes the typical amenities found in an aircraft lavatory, such as a sink 76 and conventional toilet 70.

In a preferred embodiment, lavatory monument 66 is positioned along the centerline of an aircraft. However, this is not a limitation on the present invention and the lavatory monument 66 can be positioned in an aircraft at any location. In a preferred embodiment, the third lavatory compartment 68 has approximately the same footprint or occupies about the same floor area of the aircraft size as the first and second lavatory compartments 10 and 12 combined. In another embodiment, the third lavatory compartment 68 can be replaced by a structure similar to lavatory monument 18 that includes two urinal units therein. In this embodiment, all four urinal units can include shared plumbing in the center of the entire monument.

Figure 6:
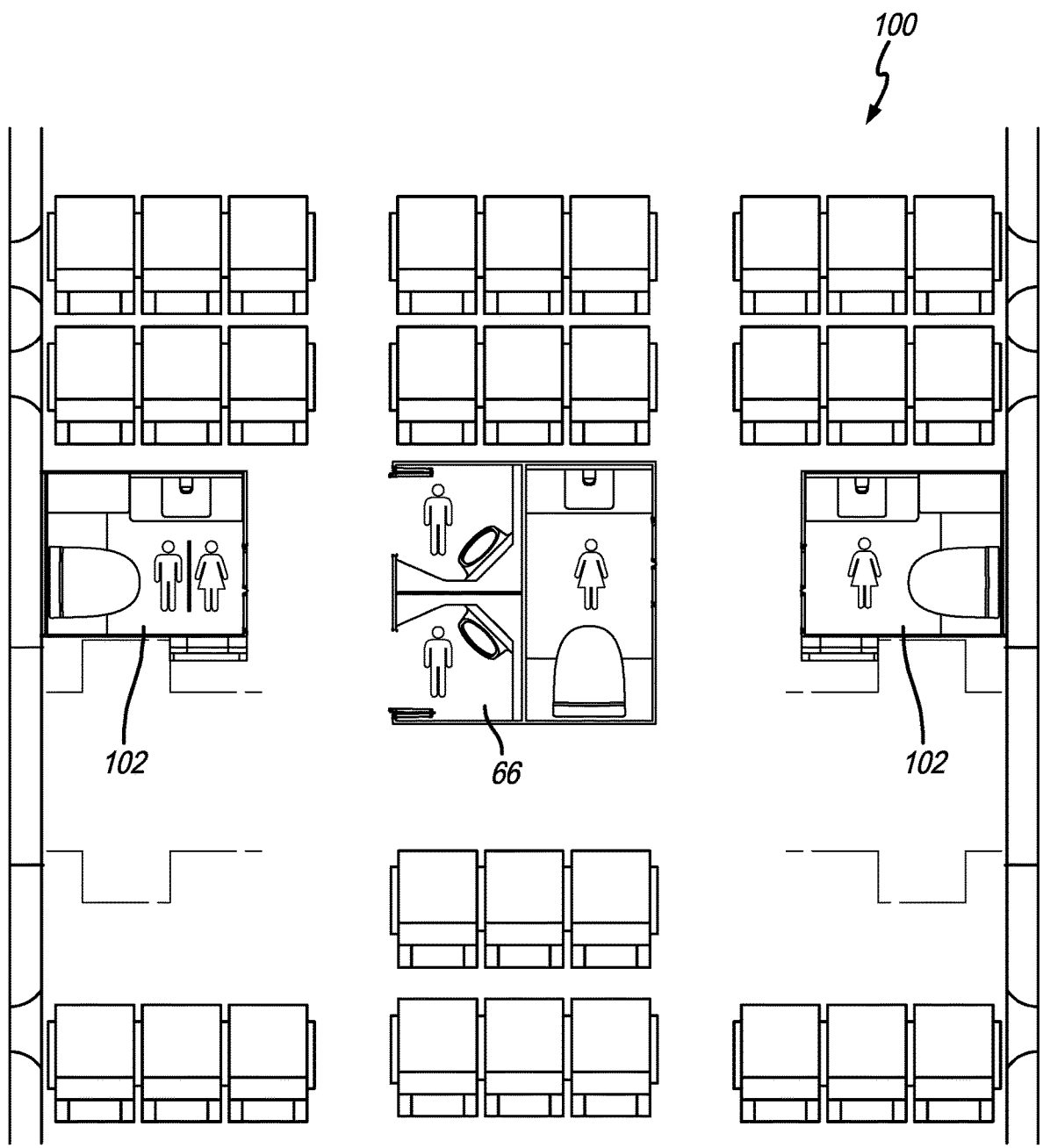
FIG. 6 is a plan view of an aircraft showing an exemplary placement of the lavatory monument.
Figure 7:
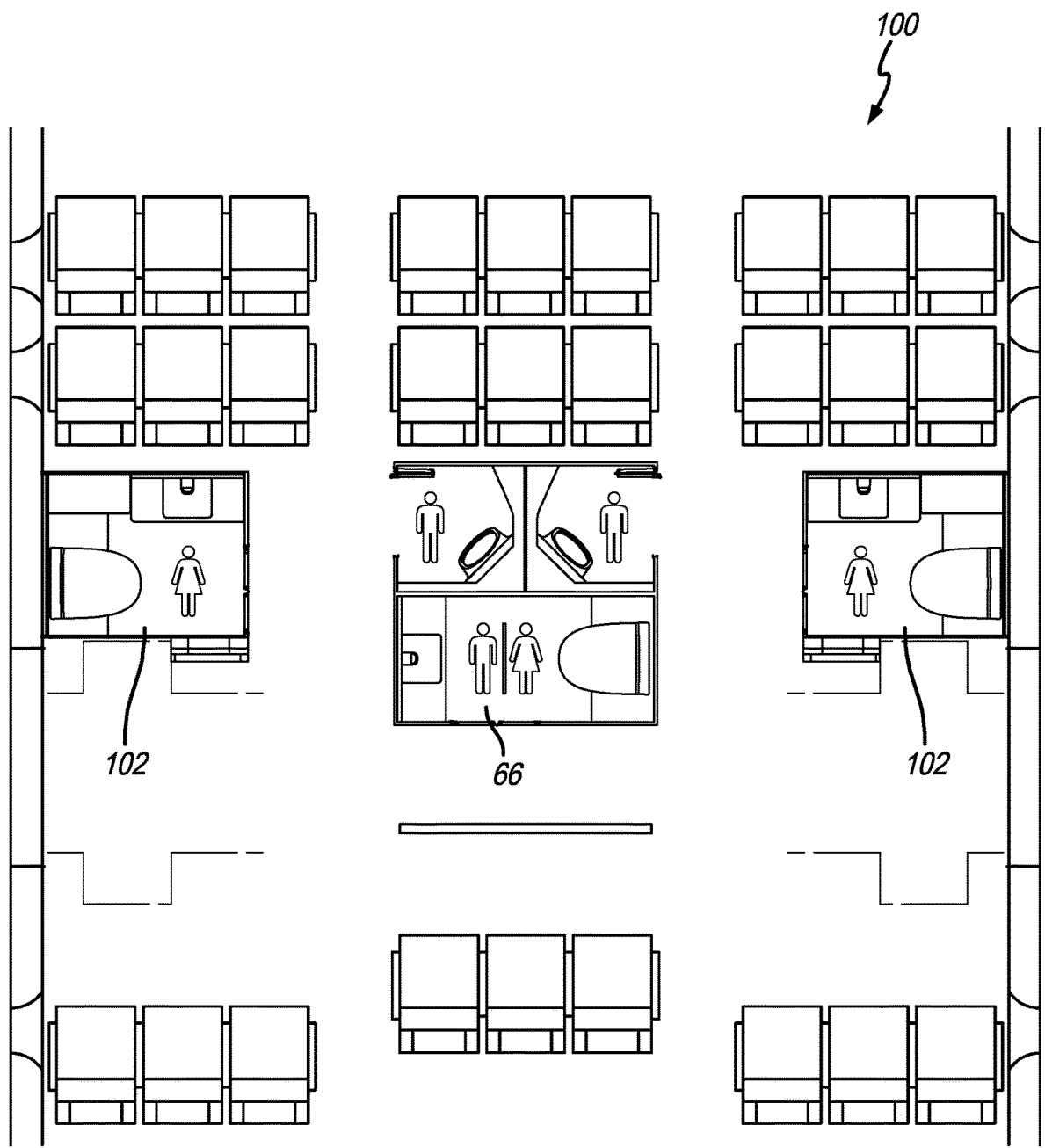
FIG. 7 is a plan view of an aircraft showing another exemplary placement of the lavatory monument.
Figure 8:
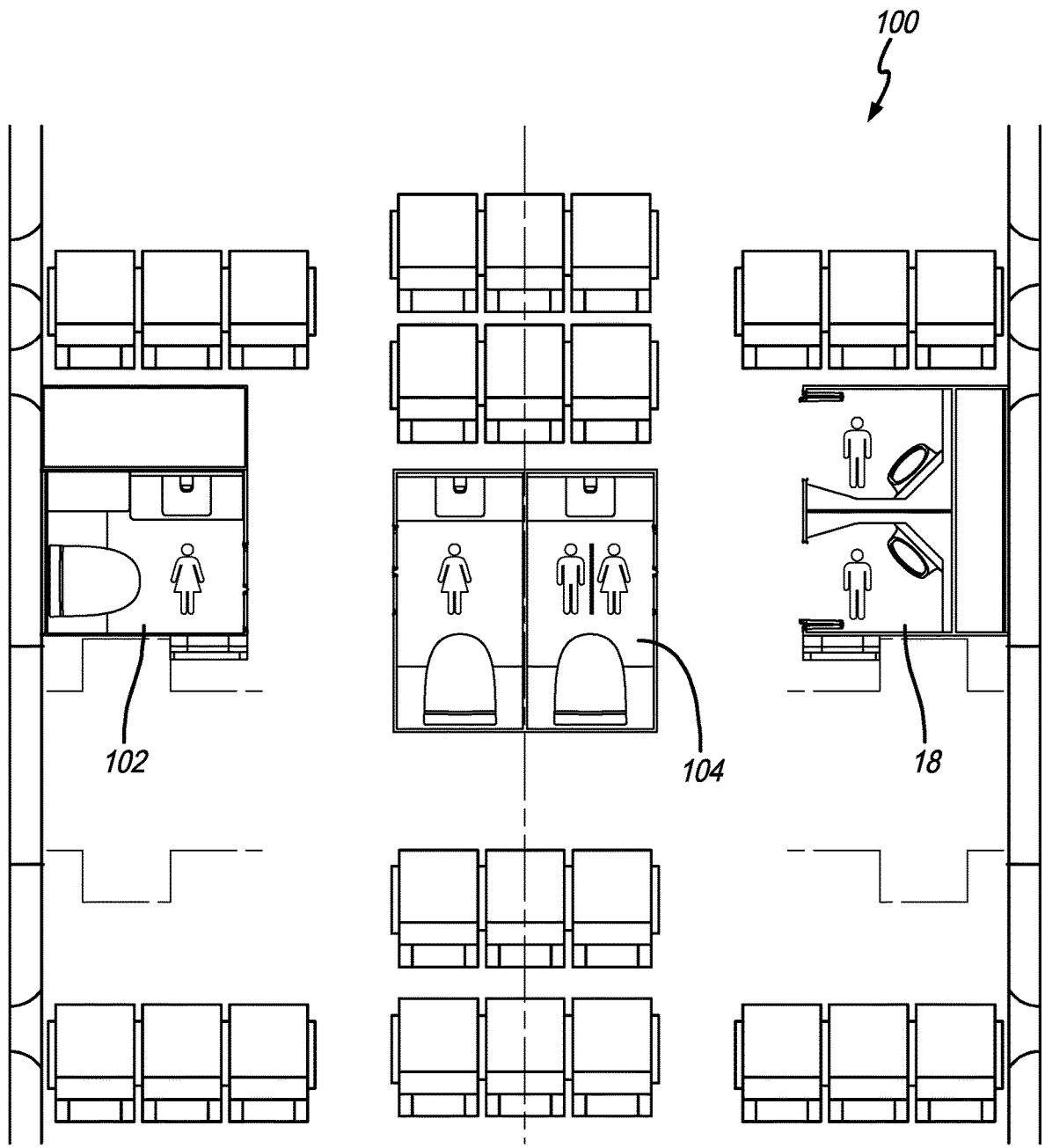
FIG. 8 is a plan view of an aircraft showing another exemplary placement of the lavatory monument.

FIG. 6-8 plan views or a layout of passenger accommodation (LOPA) of a number of different configurations where the lavatory monuments 18 and 66 can be utilized in a wide body aircraft 100. FIG. 6 shows lavatory monument 66 positioned inboard along the centerline of the aircraft with the first and second lavatory compartments 10 and 12 designated for male use and the third lavatory compartment designated for female use. The first and second doors 32 and 34 are positioned on the first wall 22. Conventional lavatory monuments 102 are positioned outboard to the left and right of the lavatory monument 66. One of the lavatory monuments 102 is designated for female use and the other is unisex. This provides three lavatories for men and three lavatories for women.

FIG. 7 shows lavatory monument 66 positioned inboard along the centerline of the aircraft with the first and second lavatory compartments 10 and 12 designated for male use and the third lavatory compartment designated for unisex use. The first and second doors 32 and 34 are positioned on the second and third walls 24 and 26. Conventional lavatory monuments 102 are positioned outboard to the left and right of the lavatory monument 66 and both are designated for female use. This provides three lavatories for men and three lavatories for women.

FIG. 8 shows a conventional lavatory monument 102 positioned outboard to the left that is designated for female use and a conventional dual lavatory monument 104 positioned along the centerline of the aircraft. One lavatory in monument 104 has been designated for female use and the other has been designated for unisex use. Lavatory monument 18 is positioned outboard to the right. Once again, this provides three lavatories for men and three lavatories for women.

In other embodiments, a single urinal compartment or lavatory can be used in combination with other cabin monuments (galleys, front row monuments or stowages) or in an area that is considered "dead space" within the aircraft. In an alternative embodiment, the third lavatory compartment can be a galley, storage compartment or other space typically used in aircraft.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further any specific numbers, measurements or dimensions noted herein are only examples: alternative implementations may employ differing values, measurements, dimensions or ranges.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A lavatory monument configured to be positioned in an aircraft interior, the lavatory monument comprising:
   an enclosure that includes first, second, third and fourth walls, and defines a lavatory interior,
   a first lavatory compartment that includes a first urinal unit positioned therein, wherein the first lavatory compartment includes a first door,
   a second lavatory compartment that includes a second urinal unit positioned therein, wherein the second lavatory compartment includes a second door, wherein the first and second urinal units include shared plumbing and are for liquid relief only,
   a divider wall separating at least a portion of the first lavatory compartment from at least a portion of the second lavatory compartment,
   a plumbing enclosure that includes a first plumbing enclosure wall positioned in the first lavatory and a second plumbing enclosure wall positioned in the second lavatory, wherein the first plumbing enclosure wall extends between the divider wall and the fourth wall, wherein the second plumbing enclosure wall extends between the divider wall and the fourth wall, wherein the shared plumbing is housed within the plumbing enclosure,
   wherein the first urinal unit is positioned on the first plumbing enclosure wall at a non-right angle to the divider wall, and wherein the second urinal unit is positioned on the second plumbing enclosure wall at a non-right angle to the divider wall,
   wherein the first door is positioned on one of the first or second walls, and wherein the second door is positioned on one of the first or third walls, and
   a first sanitizing wipes dispenser positioned in the first lavatory compartment and a second sanitizing wipes dispenser positioned in the second lavatory compartment, wherein the first and second lavatory compartments do not include washbasins therein.

2. The lavatory monument of claim 1 wherein the first sanitizing wipes dispenser is positioned on the first plumbing enclosure wall, and wherein the second sanitizing wipes dispenser is positioned on the second plumbing enclosure wall.

3. The lavatory monument of claim 1 wherein the first urinal unit is positioned at a 45° angle to the divider wall, and wherein the second urinal unit is positioned at a 45° angle to the divider wall.

4. The lavatory monument of claim 1 further comprising a third lavatory compartment, wherein the third lavatory compartment includes a conventional toilet therein.

5. The lavatory monument of claim 4 wherein the third lavatory compartment has approximately the same footprint as the first and second lavatory compartments combined.

6. The lavatory monument of claim 1 further comprising a trash enclosure that defines a trash interior, wherein the trash enclosure includes a first trash opening within the first lavatory compartment that opens to an interior of the trash enclosure and a second trash opening within the second lavatory compartment that opens to the interior of the trash enclosure.

7. The lavatory monument of claim 6 wherein the trash enclosure includes a trash access door that communicates the trash interior with an exterior of the enclosure.

8. The lavatory monument of claim 7 wherein the trash interior includes a trash receptacle positioned therein.

9. The lavatory monument of claim 6 wherein the trash enclosure includes a first trash enclosure wall positioned in the first lavatory and a second trash enclosure wall positioned in the second lavatory, wherein the first trash enclosure wall extends between the divider wall and the first wall at a non-right angle to the divider wall, and wherein the second trash enclosure wall extends between the divider wall and the first wall at a non-right angle to the divider wall.

10. The lavatory monument of claim 9 wherein the trash enclosure includes a first counter positioned on a top thereof in the first lavatory compartment and a second counter positioned on the top thereof in the second lavatory compartment.

11. A lavatory monument configured to be positioned in an aircraft interior, the lavatory monument comprising:
    an enclosure that includes first, second, third, fourth and fifth walls, and defines a lavatory interior,
    a first lavatory compartment that includes a first urinal unit positioned therein, wherein the first lavatory compartment includes a first door, a second lavatory compartment that includes a second urinal unit positioned therein, wherein the second lavatory compartment includes a second door, wherein the first and second urinal units include shared plumbing and are for liquid relief only, a divider wall separating at least a portion of the first lavatory compartment from at least a portion of the second lavatory compartment, a plumbing enclosure that includes a first plumbing enclosure wall positioned in the first lavatory and a second plumbing enclosure wall positioned in the second lavatory, wherein the first plumbing enclosure wall extends between the divider wall and the fourth wall, wherein the second plumbing enclosure wall extends between the divider wall and the fourth wall, wherein the shared plumbing is housed within the plumbing enclosure, wherein the first urinal unit is positioned on the first plumbing enclosure wall at a non-right angle to the divider wall, and wherein the second urinal unit is positioned on the second plumbing enclosure wall at a non-right angle to the divider wall, a first sanitizing wipes dispenser positioned in the first lavatory compartment and a second sanitizing wipes dispenser positioned in the second lavatory compartment, wherein the first and second lavatory compartments do not include washbasins therein, and a third lavatory compartment that includes a toilet positioned therein, wherein the third lavatory compartment includes a third door, wherein the fourth wall separates the third lavatory compartment from the first and second lavatory compartments, wherein the first door is positioned on one of the first or second walls, wherein the second door is positioned on one of the first or third walls, and wherein the third door is positioned on the fifth wall.

12. The lavatory monument of claim 11 further comprising a plumbing enclosure, wherein the shared plumbing is housed within the plumbing enclosure, and wherein the plumbing enclosure is positioned between the first and second urinal units.

13. The lavatory monument of claim 11 wherein the first urinal unit is positioned at a non-right angle to the divider wall, and wherein the second urinal unit is positioned at a non-right angle to the divider wall.

14. The lavatory monument of claim 11 wherein the first urinal unit is positioned at a 45° angle to the divider wall, and wherein the second urinal unit is positioned at a 45° angle to the divider wall.

15. The lavatory monument of claim 11 wherein the third lavatory compartment has approximately the same footprint as the first and second lavatory compartments combined.

16. The lavatory monument of claim 11 further comprising a trash enclosure that defines a trash interior, wherein the trash enclosure includes a first trash opening within the first lavatory compartment that opens to an interior of the trash enclosure and a second trash opening within the second lavatory compartment that opens to the interior of the trash enclosure.

17. The lavatory monument of claim 16 wherein the trash enclosure includes a trash access door that communicates the trash interior with an exterior of the enclosure.

18. The lavatory monument of claim 17 wherein the trash interior includes a trash receptacle positioned therein.

* * * * *